United States Patent
Axelrod et al.

(10) Patent No.: US 12,201,126 B2
(45) Date of Patent: Jan. 21, 2025

(54) PET CHEW WITH AN OUTER SURFACE PROVIDED BY A TUBULAR SHAPED ANIMAL ORGAN

(71) Applicant: IMS TRADING, LLC, Jamesburg, NJ (US)

(72) Inventors: Glen S. Axelrod, Colts Neck, NJ (US); Marcela Almeida, Sao Paulo (BR)

(73) Assignee: IMS TRADING, LLC, Jamesburg, NJ (US)

( * ) Notice: Subject to any disclaimer, the term of this patent is extended or adjusted under 35 U.S.C. 154(b) by 73 days.

(21) Appl. No.: 17/247,364

(22) Filed: Dec. 9, 2020

(65) Prior Publication Data
US 2021/0177007 A1    Jun. 17, 2021

Related U.S. Application Data

(60) Provisional application No. 62/947,898, filed on Dec. 13, 2019.

(51) Int. Cl.
| | | |
|---|---|---|
| A23K 10/26 | (2016.01) | |
| A23K 40/30 | (2016.01) | |
| A23K 50/40 | (2016.01) | |

(52) U.S. Cl.
CPC .............. *A23K 10/26* (2016.05); *A23K 40/30* (2016.05); *A23K 50/40* (2016.05)

(58) Field of Classification Search
CPC ......... A23K 10/26; A23K 40/30; A23K 50/40
See application file for complete search history.

(56) References Cited

U.S. PATENT DOCUMENTS

| | | | |
|---|---|---|---|
| 5,897,893 A | 4/1999 | Mohilef | |
| 6,277,420 B1* | 8/2001 | Andersen | A23K 50/40 426/138 |
| 8,074,609 B2 | 12/2011 | Adkins | |
| 8,479,687 B2 | 7/2013 | Anderson et al. | |
| 10,159,266 B2 | 12/2018 | Xu | |
| 2010/0047397 A1* | 2/2010 | Levin | A01K 15/026 426/307 |
| 2012/0152181 A1 | 6/2012 | Mendal et al. | |

(Continued)

FOREIGN PATENT DOCUMENTS

| | | |
|---|---|---|
| CA | 2219338 | 12/2001 |
| CA | 2217610 | 1/2006 |

(Continued)

OTHER PUBLICATIONS

Chichester, Cow Bones https://www.chichesterinc.com/CowBones.htm 2022 (Year: 2022).*

(Continued)

*Primary Examiner* — Changqing Li
*Assistant Examiner* — Carrie Glimm
(74) *Attorney, Agent, or Firm* — Grossman, Tucker Perreault & Pfleger, PLLC

(57) ABSTRACT

A chew for an animal with an outer surface provided by all or a portion of a tubular shaped animal organ, such as an organ provided by the foreskin of animal pizzle. More specifically, the present invention relates to a chew product with an outer surface provided by all or a portion of a tubular shaped animal organ and a method for forming such product where the tubular shaped animal organ enhances attraction and palatability for the animal.

20 Claims, 1 Drawing Sheet

(56) References Cited

U.S. PATENT DOCUMENTS

| | | | |
|---|---|---|---|
| 2012/0234259 A1 | 9/2012 | Xu | |
| 2014/0255553 A1 | 9/2014 | Xu | |
| 2015/0282504 A1* | 10/2015 | Andersen | A23K 50/48 |
| | | | 426/546 |
| 2017/0339981 A1* | 11/2017 | Xu | A23K 50/42 |
| 2019/0166880 A1 | 6/2019 | Xu | |
| 2022/0378018 A1 | 12/2022 | Axelrod et al. | |
| 2023/0025481 A1 | 1/2023 | Axelrod et al. | |

FOREIGN PATENT DOCUMENTS

| | | |
|---|---|---|
| CN | 101861931 | 10/2010 |
| CN | 104472902 | 4/2015 |
| CN | 208462690 | 2/2019 |

OTHER PUBLICATIONS

International Search Report and Written Opinion of International Application No. PCT/US2020/063928, mail date Apr. 22, 2021, 11 pages.

"Redbarn Jumbo Twisters Dog Treats" (Redbarn), Mar. 7, 2018, Retrieved on Feb. 3, 2021 from the internet: <url: https://www.chewy.com/redbarn-jumbo-twisters-dog-treats/dp/114408>.

"Jumbo Twister" (Redbarn) Jan. 22, 2014, Retrieved Feb. 3, 2021 from the internet: <url:https://redbam.com/products/jumbo-twister>, entire document especially p. 2.

"Bully Coated Dog Chews" (Pawstruck), Retrieved Apr. 7, 2021 from the internet: <url:https://www.pawstruck.com/collections/bully-coated-dog-chews>, entire document especially p. 1.

Office Action from related Chinese Appln. No. 202080084604.2, dated Feb. 2, 2023. English translation attached.

Office Action from related Japanese Appln. No. 2022-524925, dated Jun. 6, 2023. English translation attached.

Blog, "Penis," Japan, Non-Profitable Organization Institution of Hokkaido Natural Resources Utilization, Feb. 9, 2017, pp. 1-5. https://npohokkaido.thebase.in/blog/2017/02/09/034900. English translation not available. Concise explanation of relevancy can be found in the Japanese Office Action submitted herewith.

Office Action from related Canadian Appln. No. 3,161,622, dated Jul. 27, 2023.

Office Action from related Chinese Appln. No. 202080084604.2, dated Oct. 10, 2023. English translation attached.

Extended Search Report from European Appln. No. 20899186.9, dated Nov. 15, 2023.

Office Action from related Brazilian Appln. No. BR112022011514-8, dated Jan. 25, 2024. English translation attached.

Office Action from related Chinese Appln. No. 202080084604.2, dated Mar. 1, 2024. English translation attached.

Office Action from related Columbian Appln. No. NC2022/0006973, dated Oct. 1, 2024. English translation attached.

* cited by examiner

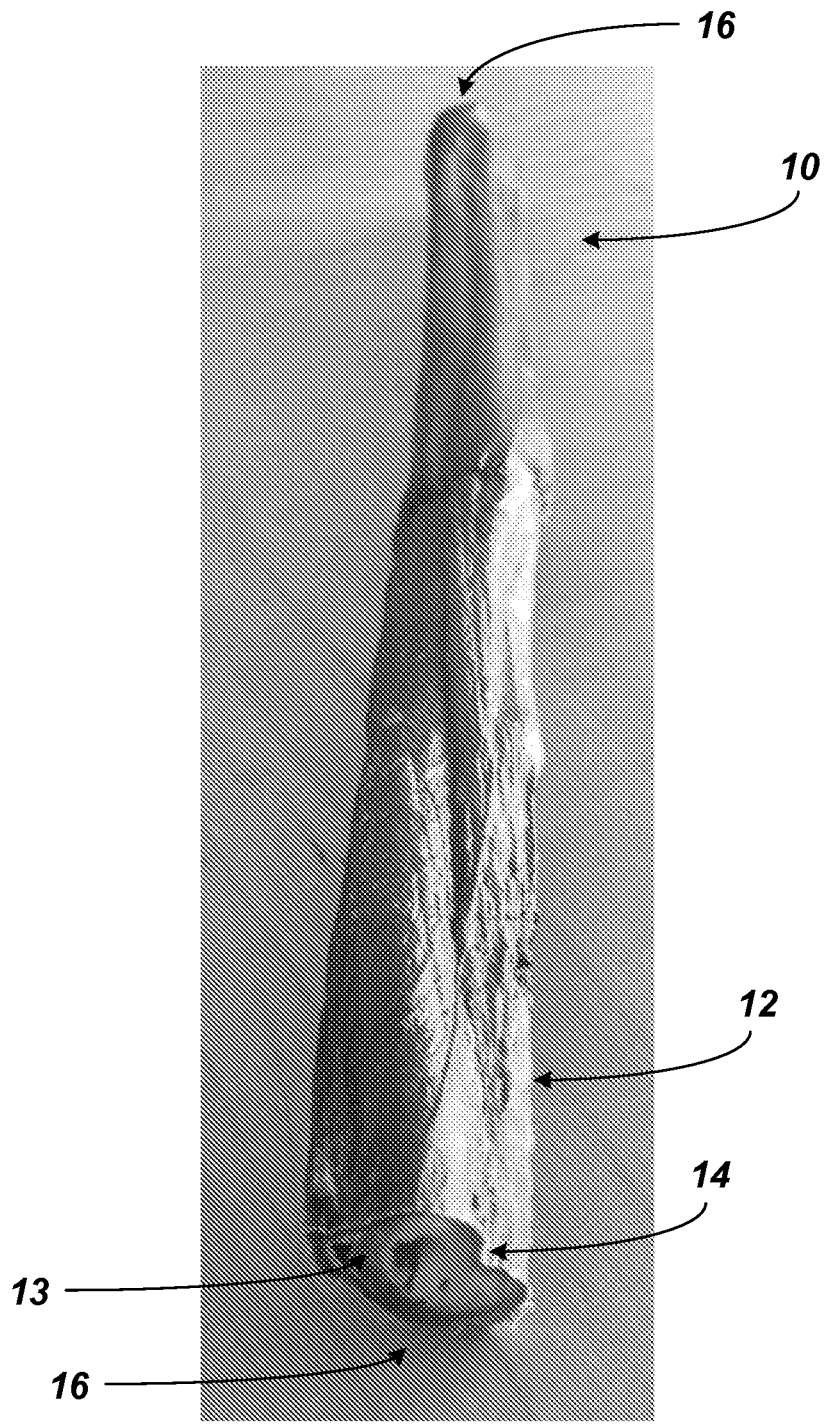

PET CHEW WITH AN OUTER SURFACE PROVIDED BY A TUBULAR SHAPED ANIMAL ORGAN

CROSS-REFERENCE TO RELATED APPLICATIONS

This application claims the benefit of U.S. Provisional Application Ser. No. 62/947,898 filed Dec. 13, 2019 which is fully incorporated herein by reference.

FIELD

The present invention relates to a chew for an animal with an outer surface provided by a tubular shaped animal organ, such as an organ provided by the foreskin of animal pizzle. More specifically, the present invention relates to a chew product with an outer surface provided by a tubular shaped animal organ and a method for forming such product where the tubular shaped animal organ enhances attraction and palatability for the animal.

BACKGROUND

A variety of reports exist directed at various types of pet chew products. This is largely based upon the fact that domestic pets, such as dogs, have an instinct to chew. Such chewing will exercise the jaws and result in frictional engagement with the pet chew to assist in maintaining relatively clean teeth.

More recently, a product known as a "bully stick" has become popular, which is made from the pizzle of a bull. Such products have been observed as having provided relatively strong attraction to an animal based upon their scent along with relatively good palatability and durability. As a result, bully sticks have become relatively popular in the pet industry.

However, bully sticks are not without some drawbacks. Among these, given the relatively reduced availability of bully sticks, the cost for producing bully sticks is relatively high. Accordingly, various efforts have been reported to provide an alternative to a bully stick, that maintains animal interest, at a potentially reduced cost.

U.S. Pat. No. 10,159,266 entitled "Edible Pet Chew of Artificial Bully Stick" is directed at a composition formed from pizzle ingredients. More specifically, disclosed is an extruded stick formed from a composition with pizzle ingredients and plant ingredients.

U.S. Pat. No. 8,479,687 entitled "Braided Pet Chew" is directed at a chew for dogs that was developed by braiding a combination of rawhide and bull or steer penis. The chew is described as having a very long chew time because of the dense leather nature of the dehydrated rawhide fraction.

U.S. Pat. No. 8,074,609 entitled "Rawhide Edible Chew with Pizzle Inner Member And Method For Making Same" is directed at a rawhide chew that includes a rawhide outer layer formed of a rawhide sheet. The rawhide outer layer comprises a hole cut therethrough to form a cut-out window. Pizzle is positioned with in the rawhide outer layer such that the pizzle is externally viewable through the cut-out window.

SUMMARY

A pet chew comprising an inner core of rawhide material and an outer layer provided by a tubular shaped animal organ. The tubular shaped animal organ can be selected from animal pizzle, veins, arteries, esophagus or intestines.

A method for forming a pet chew comprising providing an elongated rawhide material and providing a tubular shaped animal organ with a hollow core. One may then apply all or a portion of said tubular shaped animal organ over said elongated rawhide material and exposing said tubular shaped animal organ applied to said elongated rawhide to elevated temperature and shrinking said tubular shaped animal organ onto said elongated rawhide where said tubular shape animal organ engages with said elongated rawhide and provides said pet chew.

A method for forming a pet chew wherein one provides an elongated rawhide material and a tubular shaped animal organ with a hollow core. This is followed by inserting the elongated rawhide material into the hollow core of said tubular shaped animal organ and exposing the tubular shaped animal organ with said inserted rawhide to elevated temperature and shrinking the tubular shaped animal organ onto the elongated rawhide where the tubular shape animal organ engages with the elongated rawhide and provides the pet chew.

A pet chew comprising an inner core selected from a polymeric resin, animal bone or ceramic and an outer layer provided by a tubular shaped animal organ.

A method for forming a pet chew comprising providing an elongated core material selected from a polymeric resin, animal bone or a ceramic and providing a tubular shaped animal organ with a hollow core. This is followed by applying all or a portion of said tubular shaped animal organ over said elongated core and exposing said tubular shaped animal organ applied to said elongated core to elevated temperature and shrinking said tubular shaped animal organ onto said elongated core where said tubular shape animal organ engages with said elongated core and provides said pet chew.

A method for forming a pet chew comprising providing an elongated material core material selected from a polymeric resin, animal bone or a ceramic and a tubular shaped animal organ with a hollow core and then inserting said elongated core material into said hollow core of said tubular shaped animal organ and exposing the tubular shaped animal organ with said inserted elongated core material to elevated temperature and shrinking said tubular shaped animal organ onto the elongated core material where the tubular shape animal organ engages with the elongated core material and provides the pet chew.

BRIEF DESCRIPTION OF THE DRAWINGS

Reference is now made to the accompanying drawing in which:

FIG. 1 is a view of an edible pet chew with an outer layer provided by a tubular shaped animal organ.

DETAILED DESCRIPTION OF PREFERRED EMBODIMENTS

The edible pet chew herein is preferably made of a first material of rawhide. The rawhide may be obtained from the hide of an animal such as buffalo, sheep, goats, marsupial, pig, deer, elk, or cattle. Rawhide typically contains about 65-70% water, 30-35% dry material and less than 1% ash, all such percentages by weight. Preferably, a hide for use herein may be prepared by any method known to those of ordinary skill in the art.

One such exemplary method may include removing the majority of the visible fat and meat from the hide. Once the fat and meat is removed the hide may be treated in a solution of calcium carbonate or calcium hydroxide, which may loosen and aid in the removal of hair. In addition, sodium sulphide, ammonium salts or enzymes may be added to the solution. The hair may then be removed from the hide and the hide may be rinsed. The hide may then be soaked in an aqueous solution including organic acids, inorganic acids and/or acid salts, such as potassium hydrogen tartrate and sodium bicarbonate. The hide may be rinsed again forming rawhide pieces, which may assume the shape of sheets. The pieces of rawhide may be dried or further processed wet. In addition, the pieces may be soaked in a solution including hydrogen peroxide and chlorine.

In the broad context of the present invention, one can utilize what is understood as unsplit and/or split rawhide. Preferably however, it has been found beneficial to utilize the first split layer of the rawhide containing the epidermis layer, which is often identified as leather and is the most durable. This is due in part to the feature that such first layer has relatively more densely packed fibers to provide relatively improved strength. However, in the broad context of the present invention one can utilize the second and third splits of the rawhide which may have a relatively lower strength than the first layer of rawhide noted above. In addition, one may utilize a combination of splits for the edible pet chew produced herein.

The rawhide that is therefore selected is preferably provided in sheet form and rolled to provide an extended structure that may preferably resemble the appearance of a bully stick. Attention is directed to FIG. 1 which is a view of an edible pet chew 10 with a tubular shaped animal organ outer layer 12 providing an outer chew surface positioned over an inner elongated core 13 in accordance with the present invention. The inner elongated core 13 may preferably be selected from rawhide. As can be seen, the edible pet chew is preferably elongated and preferably, after formation herein and after a dehydration step, has a length of 10 inches to 12 inches. The organ outer layer may have a thickness in the range of 0.001" to 0.25", more preferably 0.020" to 0.045".

However, in the broad context of the present invention the edible pet chew in its dehydrated form is an elongated structure with a length that may fall in the range of 2.0 inches to 20.0 inches (i.e. 2.0" to 20.0"), more preferably 5.0" to 15.0", and even more preferably 6.0" to 12.0". The edible pet treat in its dehydrated form may also have a maximum diameter that is in the range of 0.25" to 1.50", more preferably 0.50" to 1.25", and even more preferably, 0.50" to 1.0". Preferably, the length of the pet chew is selected such that the animal organ-based outer surface or coating that is applied to the elongated pet chew will cover at least 50% of the surface the underlying elongated rawhide. More preferably, the organ-based coating will cover 50% to 100% of the preferred elongated rawhide surface, 60% to 100% of the preferred elongated rawhide surface, 70% to 100% of the preferred elongated rawhide surface, 80% to 100% of the preferred elongated rawhide surface, or 90% to 100% of the preferred elongated rawhide surface. In addition, the organ-based coating may be applied such that it may cover all or a portion of the end portions 16 in which case the preferred rawhide may be completely sealed within the outer organ-based based material. Furthermore, as may be appreciated, at a higher relative percentage of organ-coating or outer surface, an animal is more likely to detect the presence of such organ-based material and become relatively more interested in chewing the edible pet chew product herein.

As can also be seen in FIG. 1, the pet chew herein with an outer surface provided by all or a portion of a tubular shaped animal organ may have a shape such that there is a longitudinal groove 14 that runs along all or a portion of the length of the edible pet chew. This longitudinal groove may optionally be employed so that the chew visually resembles that of a conventional bully stick when that the edible pet chew 10 is seen by a consumer. Accordingly, the tubular shaped animal organ herein with such groove may itself have a length that may fall in the range of 2.0" to 20.0", more preferably 5.0" to 15.0", and even more preferably 6.0" to 12.0". It should also be appreciated that in the case of animal pizzle, the pizzle may be stretched to such length from some original length dimension when recovered from the animal. The tubular shaped animal organ as provided from the animal will therefore preferably have a hollow core to allow for insertion of the elongated rawhide component. However, in the broad context of the present invention, a portion of the tubular shaped animal organ may be used to apply to the elongated rawhide component.

Accordingly, all or a portion of the tubular shaped animal organ outer surface or coating may preferably be applied over the rolled rawhide, followed by a dehydration procedure, which provides for the tubular shaped organ to reduce in size and shrink and adhere to the underlying rawhide material, which is similarly undergoing dehydration, or which rawhide may have been previously dehydrated. The tubular shaped organs that therefore may be utilized preferably include animal pizzle, such as the foreskin of such animal pizzle. However, in the broad context of the present invention, one may utilize any tubular shaped animal organs with a hollow core, such as veins, arteries, esophagus or intestines. One preferred artery may include the aorta.

As noted above, the preferred rawhide component, whether split or unsplit, is typically available with water, dry material and a relatively small amount of ash. The preferred rawhide component that initially is employed which is then subject to drying may be such that for a given weight, a major portion of such initial weight is water. For example, for a given rawhide, during exposure to elevated temperature and dehydration, the yield of rawhide that results for use in the final product may therefore be around 20-30% of the initial weight. Accordingly, in the procedures herein, the amount of water lost from the rawhide may preferably be around 70-80% of the rawhide initial weight.

With regards to the tubular shaped animal component, during the exposure to elevated temperature and dehydration and shrinking, it too will experience a reduction in water content. For example, for a given tubular shaped animal component, during exposure to elevated temperature and dehydration, the yield of tubular shaped animal component may preferably be in the range of 15-25%. Accordingly, in the procedures herein, the amount of water lost from the tubular shaped animal component may preferably be in the range of 75% to 85%.

It should then be noted that when the tubular shaped animal component is now configured around all or a portion of the rawhide, the final product itself containing the rawhide and the tubular shaped animal component may preferably have an overall residual water content in the range of 5% to 20% by weight. More preferably, such overall residual water content may be in the range of 5% to 15% by weight, and even more preferably, in the range of 8% by weight to 12% by weight.

The rawhide is preferably rolled as described herein and when the tubular structure is intact, preferably inserted within the tubular shaped animal organ, and the combination (hydrated rawhide and hydrated tubular shaped animal organ) is then allowed to undergo dehydration. Alternatively, a portion of the tubular component may be applied to the rawhide. Such dehydration is preferably accomplished by exposing the combination to a temperature in the range of 50° C. to 100° C., more preferably in the range of 50° C. to 85° C. This may preferably be accomplished by placing the combination into a vented oven set at the indicated temperatures. The combination is preferably allowed to remain in such oven for a period of up to 75 hours, more preferably in the range of 40 hours to 65 hours, and even more preferably, for a period of 50 hours to 60 hours. However, as noted, it is contemplated that the rawhide may itself have undergone a previously dehydration procedure, or partial dehydration procedure, according to the above protocol.

It is further noted that the diameter of the tubular shaped animal organ and the diameter of the rawhide are preferably selected such that during dehydration, the tubular shaped animal organ will shrink such that it will engage and conform to the surface of the rawhide. The tubular animal component will therefore preferably tension itself around all or a portion of the elongated rawhide so that it remains attached. It is noted that such procedure therefore preferably avoids the need for any other attachment component, such as an adhesive positioned between the rawhide and the tubular shaped animal organ. Accordingly, the diameter of the elongated rawhide and the diameter of the tubular shaped animal organ are preferably selected such that during dehydration, a shrink-fit occurs where the tubular shaped animal organ shrinks and engages with the elongated rawhide to provide the edible pet chew herein.

From a weight percent perspective, it is noted that the weight percent of tubular shaped animal organ (e.g. pizzle foreskin) that fits and engages with the elongated rawhide is preferably present at a level of at least 3.0% by weight, and preferably in the range of 3.0% to 20.0% by weight. Accordingly, the elongated rawhide herein is preferably present in the edible pet chew herein in an amount of 97.0% to 80.0% by weight. In such manner, the edible pet chew herein that is provided is such that it provides a corresponding bully stick attraction and flavor experience for a pet, such as a dog, to chew. Furthermore, it should be appreciated that one important advantage of the edible pet chew herein is that it has relatively lower material costs than a traditional bully stick.

In addition, with respect to the hardness of the edible pet treat herein, after dehydration and attachment of the tubular shaped animal organ, such as pizzle foreskin, to the outer surface of the elongated rawhide, the Shore A Hardness was measured to fall in the range of 80-95, more preferably in the range of 85-90. This compares favorably with the Shore A hardness of a bully stick, which indicated Shore A hardness value in the range of 90-95.

It may also be appreciated herein that in lieu of rawhide, other inner core substrates may be utilized that would then be provided with an outer layer of the animal organ disclosed herein. Such inner cores may have the same type of dimensions noted above for the preferred rawhide core. For example, the rawhide core may be replaced by animal bone as well as polymeric resins, including but not limited to polyamides (nylons), polyurethanes, natural or synthetic rubber (polyisoprene based), as well as thermoplastic elastomers, such as polyester based thermoplastic elastomers and/or styrene based elastomers (e.g., styrene-butadiene block copolymers). It is also contemplated that one may utilize a ceramic composition for the core 13.

The invention has been described in various preferred embodiments. It will be appreciated that those skilled in the art will recognize that changes may be implemented that fall outside the scope of the preferred embodiments and the invention described by the accompanying claims are not limited to the preferred embodiments described herein.

What is claimed is:

1. A method for forming a pet chew comprising:
providing an elongated rawhide and a tubular shaped animal organ with a hollow core, wherein said tubular shaped animal organ with the hollow core is an animal pizzle having a tubular skin;
inserting said elongated rawhide into said hollow core of said tubular shaped animal organ and exposing the tubular shaped animal organ with said inserted rawhide to elevated temperature and shrinking said tubular shaped animal organ onto the elongated rawhide where the tubular shaped animal organ engages with the elongated rawhide and provides the pet chew.

2. The method of claim 1 wherein the elongated rawhide has a surface and the animal pizzle covers 50% to 100% of the surface of the elongated rawhide.

3. The method of claim 1 wherein the tubular skin of the animal pizzle comprises foreskin of the animal pizzle.

4. The method of claim 1 wherein the animal pizzle comprises at least 3.0% by weight of the pet chew.

5. The method of claim 1 wherein the pet chew has a length in the range of 2.0 inches to 20.0 inches.

6. The method of claim 1 wherein the pet chew has a maximum diameter in the range of 0.25 inches to 1.50 inches.

7. The method of claim 1 wherein the elevated temperature comprises a temperature of 50° C. to 100° C. for a period of up to 75 hours.

8. The method of claim 1 wherein the pet chew has a moisture content of 5% to 20% by weight.

9. The method of claim 1 wherein the animal pizzle has a thickness in a range of 0.001 inches to 0.25 inches.

10. The method of claim 1 wherein the animal pizzle has a thickness in a range of 0.020 inches to 0.045 inches.

11. A method for forming a pet chew comprising:
providing an elongated core formed of a polymeric resin and a tubular shaped animal organ with a hollow core, wherein said tubular shaped animal organ with the hollow core is an animal pizzle having a tubular skin;
inserting said elongated core into said hollow core of said tubular shaped animal organ and exposing the tubular shaped animal organ with said inserted elongated core to elevated temperature and shrinking said tubular shaped animal organ onto the elongated core where the tubular shaped animal organ engages with the elongated rawhide and provides the pet chew.

12. The method of claim 1 wherein the tubular skin of the animal pizzle comprises foreskin of the animal pizzle.

13. The method of claim 11 wherein the animal pizzle comprises at least 3.0% by weight of the pet chew.

14. The method of claim 11 wherein the pet chew has a length in the range of 2.0 inches to 20.0 inches.

15. The method of claim 11 wherein the pet chew has a maximum diameter in the range of 0.25 inches to 1.50 inches.

16. The method of claim 11 wherein the elevated temperature comprises a temperature of 50° C. to 100° C. for a period of up to 75 hours.

17. The method of claim 11 wherein the pet chew has a moisture content of 5% to 20% by weight.

18. The method of claim 11 wherein the animal pizzle has a thickness in a range of 0.001 inches to 0.25 inches.

19. The method of claim 11 wherein the animal pizzle has a thickness in a range of 0.020 inches to 0.045 inches.

20. The method of claim 11 wherein the elongated core has a surface and the animal pizzle covers 50% to 100% of the surface of the elongated core.

\* \* \* \* \*